(12) United States Patent
Fristedt et al.

(10) Patent No.: US 6,278,090 B1
(45) Date of Patent: Aug. 21, 2001

(54) DEVICE AND METHOD FOR HEATING OF A SEAT

(75) Inventors: Tommy Fristedt, Bottnaryd; Björn Aiff, Blidsberg, both of (SE)

(73) Assignee: Kongsberg Automotive AB (SE)

( * ) Notice: Subject to any disclaimer, the term of this patent is extended or adjusted under 35 U.S.C. 154(b) by 0 days.

(21) Appl. No.: 09/214,529
(22) PCT Filed: Jun. 27, 1997
(86) PCT No.: PCT/SE97/01171
§ 371 Date: Jan. 6, 1999
§ 102(e) Date: Jan. 6, 1999
(87) PCT Pub. No.: WO98/01798
PCT Pub. Date: Jan. 15, 1998

(30) Foreign Application Priority Data

Jul. 9, 1996 (SE) .................................................... 9602746

(51) Int. Cl.⁷ ..................................................... H05B 1/02
(52) U.S. Cl. ......................... 219/497; 219/202; 219/501; 297/180.12
(58) Field of Search ..................................... 219/494, 497, 219/501, 499, 505, 202, 217; 297/180.12; 307/117

(56) References Cited

U.S. PATENT DOCUMENTS

| | | |
|---|---|---|
| 4,411,385 | 10/1983 | Lamkewitz . |
| 4,926,025 * | 5/1990 | Wilhelm ................................ 219/202 |
| 5,075,537 | 12/1991 | Lorenzen et al. . |
| 5,203,497 | 4/1993 | Ratz et al. . |
| 5,288,974 * | 2/1994 | Hanzic .................................. 219/501 |
| 5,948,297 * | 9/1999 | Haubner ................................ 219/202 |
| 5,981,918 * | 11/1999 | Topp et al. ............................ 219/499 |

* cited by examiner

*Primary Examiner*—Mark Paschall
(74) *Attorney, Agent, or Firm*—Lerner, David, Littenberg, Krumholz & Mentlik, LLP

(57) ABSTRACT

The invention relates to a device for heating a seat, comprising a heating element arranged in connection to the seat and connected to a control unit, which comprises current feeding organs for feeding a current (I) through the heating element in order to heat it, a temperature sensor connected to said control unit for detecting the temperature (T) at said heating element, with the control unit being arranged for feeding said current (I) if said measured temperature (T) falls below a predetermined set temperature value ($T_B$). The invention is characterized in that the control unit comprises a communication unit for receiving information regarding said set temperature value ($T_B$) from an external unit via a transmission channel for the transfer of said information. The invention also relates to a method for heating a seat. By means of the invention, an improved temperature control for a heatable seat is provided, particularly intended for motor vehicles.

25 Claims, 2 Drawing Sheets

DEVICE AND METHOD FOR HEATING OF A SEAT

TECHNICAL FIELD

The present invention relates to a device for heating a seat, according to the preamble of appended claim 1. In particular, the invention can be applied in connection with a motor vehicle with electrically heatable seats for those travelling in the vehicle. The invention also relates to a method for heating such a seat, according to the preamble of appended claim 10.

BACKGROUND OF THE INVENTION

For reasons of comfort and safety, electrically heatable vehicle seats are used in modern vehicles. The driver's seat, as well as the other seats in the vehicle, can be so arranged that they can be heated by means of special heating elements in the form of electrically conducting wires which can be placed in each seat in the form of a heating coil. Such a heating element is normally placed in the back-rest and the cushion of each seat when the seat is manufactured. The heating element is furthermore connected to a current feeding unit which delivers current. In this manner, the heating element can be heated to a suitable temperature.

A problem in previously known heating elements is due to the desire for each seat to have a carefully adjusted temperature on its surface, i.e. on that surface which is in contact with the person travelling in the vehicle. For this purpose, the temperature of the heating element can be controlled by means of a temperature sensor which is arranged close to the heating element, and which is connected to a central control unit. Using the temperature sensor and the control unit, the present temperature can be detected. The control unit also comprises current feeding circuits which, for example, can be based on transistor or relay technology for feeding current to the heating element. In this way, the central control unit is arranged to feed a certain current to the heating element until a certain desired set value for the temperature is reached. The adjustment of this set value can be done either by means of fixed resistances or by means of an adjustable potentiometer which is adjusted by the person travelling in the vehicle.

Using the above described control method, current can be delivered to the heating element until the central control unit indicates that the set value has been reached. When this happens, the control unit will cut off the power feeding. This will cause the heating element to successively cool down. When the heating element has cooled so that its temperature again is below the set value, the power feeding will be resumed. In this way, the temperature control will continue as long as the system is operative.

Although this previously known system normally provides a reliable heating and temperature control for a vehicle seat, it however has certain drawbacks. One such drawback is due to the fact that the heating element is normally fixed in the vehicle seat when manufactured, and the heating element is adjusted according to a certain "normal seat", i.e. a seat which is defined in advance with a certain given design, upholstery, etc. The seat in this way comprises a heating element for heating the surface of the seat to a certain set temperature. However, when assembling the vehicle the manufacturer might choose to provide the seat in question with, for example, a completely different upholstery, for example a considerably much thicker upholstery than that of said "normal" seat, i.e. an upholstery which differs from that which the temperature control originally was intended for. The temperature value which is detected by the temperature sensor will reach the set value when the heating element has reached the desired temperature, but since an abnormally thick upholstery then is used on the seat, the temperature which is present on the surface of the seat will be too low. This situation thus creates an undesired deviation in the temperature control.

Another drawback of previously known systems for heating seats is that they normally comprise relatively complex and extensive electronic circuits for temperature control and current feeding to the heating element. There are, for example, PCB-solutions where a multitude of components are arranged on a certain circuit board. This might create problems as regards the reliability of the heating system.

A further drawback of previously known systems is that malfunctions can occur, for example in the heating element, without information being transferred to any central unit. For example, short circuits and breakdowns in the wire can occur in the heating element without being detected in a secure and efficient manner.

SUMMARY OF THE INVENTION

A main object of the present invention is thus to provide an improved heating of a vehicle seat in which the above-mentioned drawbacks are eliminated. This is obtained by means of a device of the initially mentioned kind, the characteristics of which will become evident from appended claim 1. The object is also obtained by means of a process of the initially mentioned kind, the characteristics of which will become evident from appended claim 10.

The device according to the invention is intended for the heating of a seat which comprises a heating element which is connected to a control unit. The control unit comprises current feeding organs for feeding a current through the heating element so that it can be heated. There is also a temperature sensor connected to said control unit for detecting the temperature at the heating element, with the control unit being arranged for feeding said current if the measured temperature falls below a predetermined set temperature. The invention is based on the control unit comprising a communication unit for receiving information regarding said set temperature from an external unit via a transmission channel. The external unit can preferably be an existing central computer unit in the vehicle. This enables the information regarding the desired set value for the temperature control to be provided in an exact manner which can be adjusted to individual seat designs already during manufacture of the vehicle in question.

According to an advantageous embodiment, the communication unit is also arranged for transmitting further information to the external unit. In this way, status and error information regarding the function of the heating element and the control unit can be transmitted from the control unit to the external unit.

The device according to the invention permits a very high reliability since most of its components can be integrated in one and the same integrated circuit.

Advantageous embodiments will become evident from the appended dependent claims.

BRIEF DESCRIPTION OF THE DRAWINGS

The invention will in the following be described in connection with an example of a preferred embodiment and the appended drawings, in which.

PREFERRED EMBODIMENT

Figure 1:
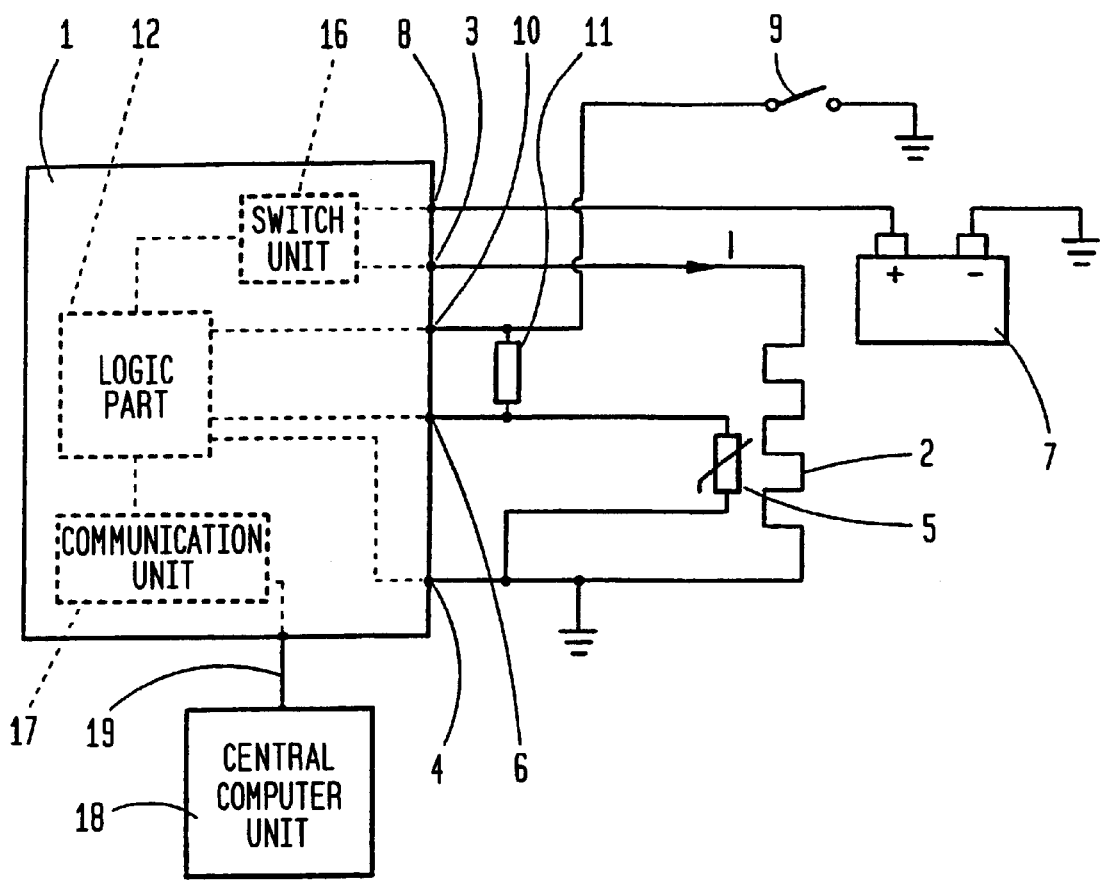
FIG. 1 is a principle circuit diagram which shows a device according to the present invention.

FIG. 1 shows a principal circuit diagram of a device according to the present invention. According to the preferred embodiment, the invention is intended to be utilized in connection with electrically heatable seats in vehicles. The figure shows, in principle, a control unit 1, whose internal components and connections (which will be described in detail below) are shown with broken lines. The figure does not show all of the components of the control unit 1, but only those parts which are necessary for the understanding of the invention.

The control unit 1 is arranged to feed a certain current I through a heating element 2. This heating element 2 is, as such, of a previously known kind, and consists of an electrical conductor which, with its electrical resistance, forms a heating coil. The heating element 2 is arranged inside a (not shown) vehicle seat, preferably in its cushion. In principle, the heating element 2 can also be placed in the back-rest of the seat. Although the figure shows only one heating element 2, it is possible to connect several such elements to the control unit 1, for example in the form of a separate heating element for the cushion of the seat and a heating element for the back-rest of the seat. If more than one heating element is used, these can be connected to the control unit either in parallel or in series.

As shown in FIG. 1, the heating element 2 is connected to the control unit 1 via two connections 3 and 4 respectively, of which the latter connection 4 is also connected to ground via a connection in the body of the vehicle.

In the vicinity of the heating element 2 there is arranged a temperature sensor 5 which is electrically conducted to the control unit 2 via the above-mentioned grounded connection 4 and a further connection 6. The temperature sensor 5 is preferably a thermistor of the NTC kind ("Negative temperature coefficient"), which has a temperature depending resistance $R_T$, which corresponds on a direct basis to the temperature T which is present in the vicinity of the heating element 2. The detection using the temperature sensor 5 will be described in detail below.

There is furthermore a current source 7 connected to the control unit 2 via a further connection 8. The current source 7 is preferably the starting battery of the vehicle. The system furthermore comprises an on/off switch 9 which is preferably integrated in the ignition lock of the vehicle (not shown). The switch 9 is connected to a further connection 10 of the control unit 1. The control unit 1 is arranged to be activated, and in this way permit heating of the heating element 2, when the switch 9 is closed.

A resistor 11 with a predetermined resistance $R_{set}$, is connected between the connection 10 to which the switch 9 is connected and the not grounded connection 6 to which the temperature sensor 5 is connected. As will be described in detail below, the resistor 11 is intended to be utilized when controlling the temperature of the heating element 2.

Figure 2:
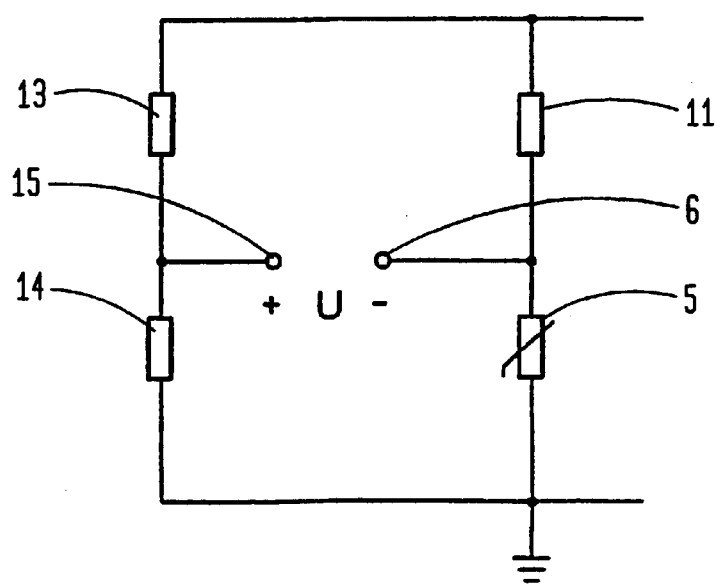
FIG. 2 shows the principle of a measurement bridge which can be utilized in temperature measurements according to the invention, and FIG. 3 schematically shows how the transfer of information according to the invention takes place.

In the following, the design and main functions of the control unit 1 will be described. The control unit 1 comprises a logic part 12, which preferably is computer based, but which can also consist of previously known electronics circuits. The logic part 12 is connected to the above-mentioned connections 4, 6 and 10, and is arranged to detect the current temperature T of the temperature sensor 5. This detection utilizes a measuring bridge of a kind the principle of which is shown in FIG. 2. The measuring bridge is of the Wheatstone-bridge kind, and comprises the resistor 11 and the temperature sensor 5, which have the resistances $R_{set}$ and $R_T$ respectively. The measuring bridge furthermore comprises two more resistors 13, 14 respectively, which preferably are integrated components in the logic part 12, but which are not shown separately in FIG. 1. The resistors 13, 14 have preset resistances $R_{13}$, $R_{14}$, respectively.

The measuring bridge furthermore comprises (according to FIG. 2) two connections, between which there is a certain voltage U. One of these connections corresponds to the connection 6 of FIG. 1, while the other connection 15 is an integrated part of the logic part 12. The logic part 12 is arranged to measure the voltage U during detection of the temperature T of the temperature sensor 5. When the measuring bridge is in balance, i.e. when the voltage U equals zero, the single unknown resistance, i.e. the resistance $R_T$ of the temperature sensor 5, can be computed according to known formulae. In this way, the logic part 12 can calculate a value of the resistance $R_T$, which in turn can be converted to a value of the present temperature T.

With renewed reference to FIG. 1, it can be seen that the control unit 1 comprises a switch unit 16, which depending on signals from the logic part 12 feeds the current I through the heating element 2. The switch unit 16 which is connected to the above-mentioned connections 3 and 8, is preferably based on a MOSFET transistor, which is a semi-conductor currents from the current source 7 to the heating element 2.

The logic part 12 is thus arranged to calculate a value of the current temperature T. If the temperature T falls below a preset value $T_B$ which corresponds to a certain desired temperature on the surface of the vehicle seat, and which in general is decided by the choice of the resistances $R_{13}$, $R_{14}$, $R_{set}$ and the basic resistance of the thermistor 5, the logic part 12 will control the switch unit 16 to deliver the current I to the heating element 2. When the set value $T_B$ is reached, the logic part 12 cuts off the current feeding via the switch unit 16 to the heating element 2.

According to the embodiment, the control unit 1 also comprises a communication unit 17. Its main purpose is to ensure that information regarding the desired set value $T_B$ for temperature control of the heating element 2 is transferred to the control unit 1 from an external unit in the shape of a central computer unit 18. The central computer unit 18 is preferably an existing computer in the vehicle which, for example, is used for climate control of the vehicle, for the ignition system of the vehicle, or similar purposes. The transmission of information is carried out via a transmission channel 19, which preferably consists of an electrical cable.

Figure 3:
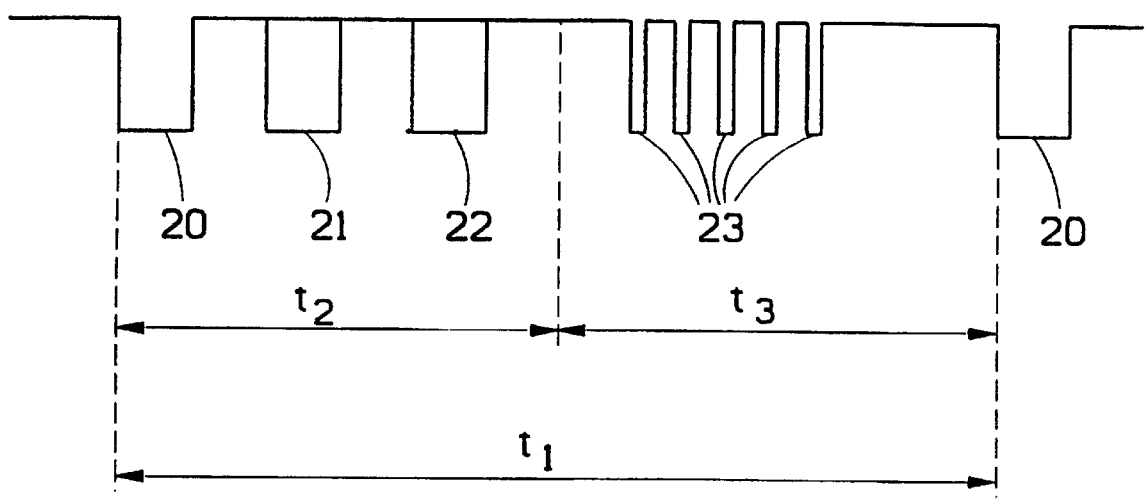

As shown in FIG. 3, the transmission of information between the control unit 1 and the central computer unit 18 is controlled by a periodic sequence with a certain preset period time $T_1$. The transfer of information is based on the basic principle that information which corresponds to a certain desired value of the set temperature $T_B$ is transferred from the central computer unit 18 to the control unit 1. There is furthermore preferably also a transfer of information in the opposite direction, i.e. from the control unit 1 to the central computer 18. This additional information from the control unit 1 can suitably comprise status information. During the total period $t_1$, there is transmission from the control unit 1 to the central computer unit 18 during a certain period of time $t_2$, while the transfer from the central computer unit 18 to the control unit 1 takes place during another period of time $t_3$.

FIG. 3 thus shows a certain period for the transmission of information. According to the preferred embodiment of the invention, the transfer of information is initiated by a start-bit 20 being transferred from the control unit 1 to the central computer unit 18. For this purpose, the communication unit 17 comprises a (not shown) oscillator circuit, which as such is previously known and which is arranged to be able to periodically emit pulses via the connection 19. The central computer unit 18 is furthermore, in a known manner, provided with a (not shown) detection circuit for detecting pulses via the connection 19. The transmission of a start-bit 20 from the control unit 1 initiates a certain period, and indicates that the control unit 1 is ready for function, and that current can be fed to the heating element 2.

Subsequent to the transfer of the start-bit 20, one or two status-bits 21, 22, respectively are, where applicable, transferred from the control unit 1. According to the embodiment, the first status-bit 21 will be transferred if the heating element 2 is "active", i.e. if current is being fed to the heating element 2. In this case, a negative pulse is thus transferred, as indicated in the drawing. Furthermore, the second status-bit 22 will be transferred (in the shape of a negative pulse) if there is a malfunction of the heating element 2. Examples of malfunctions which can occur are that some part of the heating element 2 has been short circuited, or that a breakdown has taken place in the conductor which the heating element 2 consists of. The start-bit 20 and the status-bits 21, 22 can thus be transferred during an interval of time $t_2$ which is defined in advance, and thus delivers information regarding the current status of the heating element 2 and the control unit 1 to the central computer 18. Transfer of the pulses 20, 21, 22, is asynchronous, i.e. the pulses are counted by the central computer unit 18, which in this application is the receiving side.

The next phase of a certain period consists of the transfer of a desired set value $T_B$ for temperature control of the heating element 2. This set value is transferred from the central computer 18 to the control unit 1. For this purpose, there is during the period of time $t_3$ a transfer of a number of pulses 23 from the central computer 18. To be more precise, the transfer takes place via a connection 19 and the communication unit 17 to the logic part 12 (see FIG. 2). The communication unit 17 is furthermore provided with a (not shown) detection circuit for counting of the number of pulses 23. According to the invention, the number of pulses 23 corresponds to a certain set temperature value $T_B$ for the temperature control of the heating element 2. By way of example, FIG. 3 shows the transfer of five pulses 23. This could correspond to a set value $T_B$, which can, for example, be 35° C., which in turn corresponds to a certain desired temperature on the surface of the seat. If, for example, the set value 36° C. is desired, six pulses 23 can for example be transferred.

The set value $T_B$ is transferred to the logic part 12 of the control unit 1. With reference to FIGS. 1 and 2, it can be seen that a certain given set value $T_b$ corresponds to a certain expected resistance $R_T$ of the temperature sensor 5. This corresponds to the logic part 12 changing the values of the resistances $R_{13}$ and $R_{14}$, thus causing a balance in the measuring bridge (see FIG. 2) at the current set temperature. This can be done by means of (not shown) switch transistors in the logic part 12, which switch between various resistance values in a (not shown) resistance ladder. The resistance $R_{set}$ of the resistor 11 is not affected by which set value $T_B$ has been transferred. When the correct temperature has been reached, the resistance $T_B$ of the temperature sensor 5 will be of such a magnitude that balance is obtained in the measuring bridge. This corresponds to the set value $T_B$ having been reached.

The central computer 18 is arranged to deliver information regarding the desired set value temperature $T_B$. In this way, a correct control of the heating element 2 is obtained, regardless of, for example, which upholstery the seat in question is provided with. The central computer 18 can, when manufacturing the vehicle, be provided with information regarding the seat, which in turn gives a direct information regarding current set-point adjustments. In connection with this, compensation for various kinds of upholstery for the seat in question can, for example, be made.

According to the embodiment, the logic unit 12 is also arranged to detect the case where no pulse 23 at all is transferred during the period of time $t_3$. This is interpreted as a "reset" signal by the logic part 12, which causes any ongoing current feeding to the heating element 2 to stop. It also preferably causes the entire logic part 12 to be set to zero, i.e. flip-flops, switches, registers and counters are set to zero. For example, error flip-flops which detect a short-circuit of the heating element 2 are set to zero. In this way, intermittent errors can be detected. Preferably, the system is also shut off so that the heating stops if a too large amount of pulses is received, i.e. an amount of pulses which exceeds the highest possible set temperature value.

As is evident from the above description, the communication between the central computer unit 18 and the control unit 1 is of the serial kind. This means that only one connection is necessary between the central computer unit 18 and the control unit 1, which in turn reduces the costs in connection with the invention.

The duration of the periods of time $t_1$, $t_2$ and $t_3$ can be varied, and depends, among other things, on how the oscillator circuit in the communication unit 17 is designed. Preferably, the duration of the period of time $t_1$ (i.e. the time between two start pulses 20) is of the order of size from 600 to 1000 ms, the period of time $t_2$ is ca 100–200 ms and the period of time $t_3$ is ca 500–800 ms. Thus, the period of time $t_2$ is about 10–30% of the total period of time $t_1$, while the period of time $t_3$ is about 70–90% of the entire period. The central computer unit 18 detects start of a certain period by detecting the start-bit 20. The computer unit 18 can also calculate the period of time $t_1$ by measuring the time between two start-bits 20. By knowing during which part of the period of time $t_1$ information regarding the status of the heating element is expected to be received, the pulses 21 and 22 can be detected. Following this, a certain number of pulses 23 can be transferred during the period of time $t_3$. This means that the central computer unit 18 does not necessarily need to be synchronized with the communication unit 17.

According to the preferred embodiment, the logic part 12 is preferably so arranged that data which is received by the central computer unit 18, i.e. data which corresponds to a certain desired set value $T_B$, for the above described temperature control is given a validity time. This means that data transferred to the logic part 12 can only be utilized for temperature control of the heating element during a certain limited period of time. This maximal period of time can vary, but is preferably set to a value $t_{max}$, which corresponds to one or a few periods of time (with the period time $t_1$), according to the sequence shown in FIG. 3. If the logic part 12 receives a certain set value $T_B$, and subsequently does not receive a new set value within a period of time which corresponds to said value $t_{max}$, the logic part 12 will stop the current feeding to the heating element 2 (or alternatively greatly reduce the current feeding to a preset level). In this way, possible erroneous data which is transferred to the logic part 12, for example due to malfunctions which occur in the transmission channel 19 or the transfer of data, will not cause an erroneous set value to be utilized for temperature control of the heating element 2 during a significant period of time. This, of course, is an advantage of the invention as regards safety, which can be used to prevent incorrect heating of the heating element 2.

The components of the control unit 1 can, using modern technology, be integrated into a single application specific integrated circuit (ASIC), which enables a very high degree of reliability of the invention. The communication unit 17, the logic part 12 and the switch unit 17 are preferably arranged on the same silicon chip. Alternatively, the various circuits can be assembled on separate silicon chips but in the same integrated circuit, i.e. in the same package.

Furthermore, there is according to the invention a (not shown) pull-up resistance arranged integrated in the control unit 1. To be more exact, this resistance is arranged as a terminal resistance on the transmission channel 19.

The invention is not limited to that which has been described above; various embodiments are possible within the scope of the claims. For example, the invention can, in principle, be used for heating other seats than vehicle seats. Furthermore, various kinds of temperature sensors can be used, e.g. thermistors with a negative or positive temperature coefficient. An existing temperature sensor for the temperature in the passenger compartment of the vehicle can also, in principle, be utilized. Furthermore, the switch unit 16 can be based on, for example, MOSFET or relay technology.

The information which is intended to be transferred from the control unit 1 to the external unit 18 (and which according to the above-mentioned embodiment corresponds to bits 20, 21 and 22) can, as mentioned above, be status information, i.e. information which describes the state of the heating element 2. This transferred information can furthermore be diagnostic information, i.e. information which indicates whether there is a malfunction of, for example, the heating element 2, the temperature sensor 5, or the control unit 1, or whether there are line interruptions or short-circuits.

It should be noted that the invention can also be utilized if no start or status information (i.e. bits 20, 21 and 22) is transferred from the control unit 1. This corresponds to the presence of a one-way communication from the central computer unit 18 to the control unit 1. The minimum of information which must be transferred from the central computer unit 18 is a series of pulses 23 which is transferred during a certain interval of time, and which indicates a desired set value $T_B$ for the temperature control. Furthermore, said set value $T_B$ does not necessarily need to be transferred in such a way that the number of pulses corresponds to a certain temperature value. Alternatively, coded signals can be transferred where a certain digital word corresponds to a certain temperature value.

If status or diagnostic information is transferred from the control unit 1, the number of information bits does not necessarily need to be two, but can be varied depending on the information which is intended to be transferred from the control unit 1.

According to an alternative design, the desired set value for the temperature control can be set by the user by means of choice of the resistance $R_{set}$ In this case, no transfer is thus necessary via the connection 19.

The external unit 19 can be computer based or can be a unit which is not computer based. Finally, the connection 19 can be an electrical cable, an optical cable or a radio connection.

What is claimed is:

1. Device for heating a seat in a vehicle, comprising a heating element arranged in the seat and connected to a control unit which includes current feeding organs for feeding a current through said heating element to heat said heating element, a temperature sensor connected to said control unit for detecting measuring the temperature at said heating element, with said control unit arranged to feed said current if said measured temperature falls below a predetermined set temperature value, wherein said control unit includes a communication unit for receiving information regarding said set temperature value from an external unit arranged for storing data regarding the design of said seat, which data is used for determining said information, wherein said information is transmitted via a transmission channel from said external unit to said control unit.

2. Device according to claim 1, wherein said communication unit is also arranged for the transmission of additional information to said external unit.

3. Device according to claim 2, wherein said additional information comprises information regarding the operational state of said heating element.

4. Device according to claims 2 or 3, wherein said additional information further includes a start pulse for the initiation of a periodic sequence, during which said information and said additional information is transferred.

5. Device according to claim 1, wherein said control unit comprises an oscillator circuit for the transfer of pulses with a given periodicity, which pulses correspond to said information.

6. Device according to claim 1, wherein said control unit is so arranged that said information received regarding said set temperature value is given a limited time of validity, subsequent to which said feeding of current is reduced to a preset value.

7. Device according to claim 1, wherein said control unit further includes a logic part, and a switch unit which is part of said current feeding organs, in which said logic part, said switch unit, and said communication unit are arranged as an integrated circuit.

8. Device according to claim 7, wherein said communication unit said logic part and/or said switch unit are arranged on a single silicon chip.

9. A device according to claim 2, wherein said additional information comprises information regarding the operational state of said control unit.

10. A device according to claim 9, wherein said additional information comprises information regarding the operational state of said heating element.

11. A device according to claim 1, wherein said external unit comprises a previously existing computer in the vehicle.

12. Method for heating a seat in a vehicle having a heating element connected to a control unit which is arranged to feed a current (I) through the heating element, the method comprising:

detecting an actual temperature in the vicinity of said a heating element, feeding a current through said heating element if said actual temperature falls below a predetermined set temperature value, and transferring information regarding said set temperature value to said control unit from an external unit which is arranged for storing data regarding the design of said seat, wherein said data is used for determining said information.

13. Method according to claim 12, said information regarding said set temperature value is transferred using said information in the shape of a series of pulses, the number of pulses in said series of pulses being in direct correspondence to a value of said set temperature value.

14. Method according to claim 12, wherein said information regarding said set temperature value is given a limited time of validity, subsequent to which said feeding of current is reduced to a predetermined value.

15. Method according to claims 12 or 13, further comprising transferring status information regarding the operational condition of said heating element from said control unit to said external unit.

16. Method according to claims 12 or 13, further comprising transferring diagnostic information regarding possible malfunctions of said control unit and components which are connected to said control unit from said control unit to said external unit.

17. Method according to claim 15, wherein information and said status information are transferred in the form of at least one pulse, and according to a periodic sequence which is controlled by said control unit.

18. Method according to claim 17, wherein said steps of transferring said information and said status information further includes transferring a start pulse from said control unit to indicate a new period of said periodic sequence.

19. Method according to claim 17, wherein each period has a duration of a predetermined first interval of time, wherein said transfer of said status information from said control unit takes place during a second interval of time, said second interval of time having a magnitude, and wherein said transfer of said information from said external unit takes place during a third interval of time said third interval of time being a magnitude.

20. Method according to claim 19, wherein said second and third intervals of time are controlled by said control unit.

21. Method according to claim 19, wherein said magnitudes of said second and third intervals of time are determined by the duration of the previous first interval of time, and are computed in said external unit.

22. Method according claim 19, wherein said second interval of time constitutes 10–30% of said first interval-of time, and said third interval of time constitutes 70–90% of said first interval of time.

23. Method according to claim 13, wherein the number of pulses regarding said set temperature value is within a predetermined interval, which corresponds to different temperatures, and wherein the reception of a too large or too small amount of pulses by said control unit causes said step of feeding said current to be turned off.

24. Method according to claim 13, wherein the number of pulses regarding said set temperature value is within a predetermined interval, which corresponds to different temperatures, wherein the reception of a too large or too small amount of pulses by said control unit causes flip-flops, switches, registers and counters of said control unit to be set to zero.

25. Method according to claim 15, wherein said transferring said information and said status information, are transferred serially via a transmission channel between said control unit and said external unit.

* * * * *

UNITED STATES PATENT AND TRADEMARK OFFICE
CERTIFICATE OF CORRECTION

PATENT NO. : 6,278,090 B1
DATED : August 21, 2001
INVENTOR(S) : Fristedt et al.

It is certified that error appears in the above-identified patent and that said Letters Patent is hereby corrected as shown below:

Column 4,
Line 30, "currents" should read -- current --.

Column 5,
Line 57, "$T_b$" should read -- $T_B$ --.

Column 6,
Line 57, after "$T_B$" delete ",".
Line 62, after "$t_{max}$" delete ",".

Column 7,
Line 66, after "$R_{sel}$" insert -- . --.

Column 8,
Line 11, delete "detecting".
Line 29, "is" should read -- are --.
Line 44, after "unit" insert -- , --.
Line 58, delete "a".

Column 9,
Line 1, after "12," insert -- wherein --.

Column 10,
Line 1, after "time" insert -- , --.
Line 9, after "according" insert -- to --.
Line 11, after "interval" delete "-".
Line 28, after "information" delete ",".

Signed and Sealed this

Thirteenth Day of August, 2002

Attest:

Attesting Officer

JAMES E. ROGAN
*Director of the United States Patent and Trademark Office*